United States Patent
Cho et al.

(10) Patent No.: US 8,498,257 B2
(45) Date of Patent: Jul. 30, 2013

(54) METHOD FOR TRANSMITTING DATA ACCORDING TO DYNAMIC RESOURCE REQUEST

(75) Inventors: Hee Jeong Cho, Anyang-si (KR); Jin Young Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 273 days.

(21) Appl. No.: 12/994,422

(22) PCT Filed: May 26, 2009

(86) PCT No.: PCT/KR2009/002775
§ 371 (c)(1),
(2), (4) Date: Dec. 15, 2010

(87) PCT Pub. No.: WO2009/145545
PCT Pub. Date: Dec. 3, 2009

(65) Prior Publication Data
US 2011/0075628 A1    Mar. 31, 2011

Related U.S. Application Data

(60) Provisional application No. 61/056,019, filed on May 26, 2008.

(30) Foreign Application Priority Data

Aug. 25, 2008 (KR) .................... 10-2008-0082885

(51) Int. Cl.
*H04W 4/00* (2009.01)

(52) U.S. Cl.
USPC ........... 370/329; 370/328; 370/338; 370/335; 370/341; 370/342; 370/349; 370/235; 370/230; 370/331; 455/450; 455/451; 455/452.1; 455/452.2

(58) Field of Classification Search
USPC .............. 370/328, 329, 338, 335, 342, 479, 370/441, 235, 230, 331; 455/450, 451, 452.1
See application file for complete search history.

(56) References Cited

U.S. PATENT DOCUMENTS

| 2002/0093930 A1* | 7/2002 | Dertz et al. .................... 370/337 |
| 2003/0103520 A1* | 6/2003 | Chen et al. ..................... 370/444 |

(Continued)

FOREIGN PATENT DOCUMENTS

| KR | 10-0606101 B1 | 7/2006 |
| KR | 10-2006-0100202 A | 9/2006 |

OTHER PUBLICATIONS

Cho et al., "CINR Reports for OFDMA PHY", IEEE C802.16e-05/299r2, Jun. 13, 2005, 14 pages.

(Continued)

*Primary Examiner* — Ian N Moore
*Assistant Examiner* — Phong La
(74) *Attorney, Agent, or Firm* — Birch, Stewart, Kolasch & Birch, LLP

(57) ABSTRACT

A method for transmitting uplink data according to a dynamic resource request is disclosed. The method includes confirming, at a mobile station, whether a service type for a bandwidth request is sensitive to delay, if the service type is not sensitive to delay, shifting a phase of a fast feedback channel and transmitting the phase-shifted fast feedback channel, if the service type is sensitive to delay or if a bandwidth request grant message corresponding to the phase-shifted fast feedback channel is received from a base station, transmitting a bandwidth request information corresponding to the service type to the base station, and upon receiving an uplink grant message for an uplink resource according to the bandwidth request information from the base station, transmitting data though the uplink resource. As a result, collision does not occur during a resource request, quality of service (QoS) of a real-time traffic sensitive to delay can be satisfied, an uplink allocation request procedure is dynamically changed according to a service type, thus reducing message overhead, and a resource can be efficiently used according to a characteristic of a service provided to the mobile station.

12 Claims, 11 Drawing Sheets

U.S. PATENT DOCUMENTS

| | | | |
|---|---|---|---|
| 2005/0041573 A1* | 2/2005 | Eom et al. | 370/208 |
| 2005/0265227 A1 | 12/2005 | Byun et al. | |
| 2006/0013185 A1 | 1/2006 | Seo et al. | |
| 2006/0072514 A1* | 4/2006 | Kent et al. | 370/335 |
| 2006/0077929 A1* | 4/2006 | Park | 370/329 |
| 2006/0154671 A1 | 7/2006 | Kang et al. | |
| 2006/0239241 A1 | 10/2006 | Eom et al. | |
| 2006/0250963 A1 | 11/2006 | Jin et al. | |
| 2007/0104177 A1* | 5/2007 | Hwang et al. | 370/348 |
| 2007/0195764 A1* | 8/2007 | Liu et al. | 370/389 |
| 2007/0206561 A1* | 9/2007 | Son et al. | 370/346 |
| 2007/0264936 A1* | 11/2007 | Kim et al. | 455/45 |
| 2007/0274265 A1 | 11/2007 | Yoon et al. | |
| 2008/0232240 A1 | 9/2008 | Baum et al. | |
| 2009/0040970 A1* | 2/2009 | Ahmadi et al. | 370/329 |
| 2009/0041110 A1* | 2/2009 | Malladi | 375/240 |
| 2009/0258647 A1* | 10/2009 | Yamada et al. | 455/435.1 |
| 2010/0134324 A1* | 6/2010 | Kim et al. | 340/994 |
| 2011/0075628 A1* | 3/2011 | Cho et al. | 370/329 |
| 2011/0205997 A1* | 8/2011 | Chun et al. | 370/329 |

OTHER PUBLICATIONS

Lee et al., "Fast Dedicated Retransmission Scheme for Reliable Multicast Services in OFDMA Systems", Vehicular Technology Conference, VTC-2005-Fall, 2005, pp. 1108-1112.

U.S. Appl. No. 12/988,715, filed Oct. 20, 2010.

* cited by examiner

METHOD FOR TRANSMITTING DATA ACCORDING TO DYNAMIC RESOURCE REQUEST

CROSS REFERENCE TO RELATED APPLICATION

This application is the National Phase of PCT/KR2009/002775 filed on May 26, 2009, which claims priority under 35 U.S.C. 119(e) to U.S. Provisional Application No. 61/056,019 filed on May 26, 2008 and under 35 U.S.C. 119(a) to Patent Application No. 10-2008-0082885 filed in the Republic of Korea, on Aug. 25, 2008, all of which are hereby expressly incorporated by reference into the present application.

TECHNICAL FIELD

The present invention relates to uplink allocation of a wideband wireless access system, and more particularly, to a method for transmitting uplink data according to a dynamic resource request.

BACKGROUND ART

In a wideband wireless access system, a bandwidth request method is classified into a contention-based request scheme and a contention-free request scheme. In the contention-based request scheme, a plurality of users contends for a bandwidth request in one channel. In the contention-free request scheme, a bandwidth request is transmitted through a channel allocated to each user. When using the contention-free request scheme, a mobile station may transmit a bandwidth request message through a channel allocated by polling of a base station via unicast or may transmit the bandwidth request message by piggybacking on a remaining region of a previously allocated bandwidth.

FIG. 1 illustrates an uplink resource allocation procedure for a mobile station using a contention-based request scheme.

A mobile station (MS) transmits a randomly selected code division multiple access (CDMA) code to a randomly selected slot in a region allocated for a bandwidth request (S110).

Upon recognizing the CDMA code transmitted by the MS, a base station (BS) allocates a resource for the MS to transmit a bandwidth request message using a CDMA_ allocation_IE (S120). The MS then transmits the bandwidth request (BW_REQ) message using the allocated resource region (S130). The bandwidth request message includes information as to a size of a bandwidth which is being requested. If the bandwidth requested by the MS is available, the BS allocates an uplink resource (S140). The MS transmits data using the allocated uplink resource (S150).

FIG. 2 illustrates an uplink resource allocation procedure for an MS using polling in a contention-free request scheme.

A BS periodically allocates an uplink resource for the MS to transmit a bandwidth request message (S210).

The MS transmits, to the BS, the bandwidth request message including information as to a bandwidth corresponding to a size of data to be transmitted by the MS (S230).

If the bandwidth requested by the MS is available, the BS allocates an uplink resource (S240). The MS transmits corresponding data using the allocated uplink region (S250).

The conventional contention-based request scheme includes a three-step procedure (i.e., the CDMA code, allocation, and BW-REQ) and the first step may create collision. Therefore, it is not proper to transmit signaling information or traffic which is sensitive to delay. In the polling scheme, as the number of MSs receiving polling is increased, a resource for transmitting the bandwidth request message (minimum 3 bytes 8=24 bits) and signaling information for indicating the resource information are increased.

DISCLOSURE OF INVENTION

Technical Problem

An object of the present invention devised to solve the problem lies in providing an uplink data transmission method using profile indices, in which the amount of signaling information necessary for resource allocation can be reduced by dynamically changing a bandwidth request message according to a service type in an MS.

The present invention is not limited to the above-described technical problems and other technical problems which are not described will be clearly understood by persons skilled in the art from the following description.

Technical Solution

The object of the present invention can be achieved by providing a method for transmitting uplink data according to a dynamic resource request by requesting an uplink bandwidth by a contention-free request scheme in a mobile station. The method includes confirming whether a service type for a bandwidth request is sensitive to delay, if the service type is not sensitive to delay, shifting a phase of a fast feedback channel and transmitting the phase-shifted fast feedback channel, if the service type is sensitive to delay or if a bandwidth request grant message corresponding to the phase-shifted fast feedback channel is received from a base station, transmitting a bandwidth request information corresponding to the service type to the base station, and upon receiving an uplink grant message for an uplink resource according to the bandwidth request information from the base station, transmitting data though the uplink resource.

If the bandwidth request grant message corresponding to the phase-shifted fast feedback channel is received from the base station, the mobile station may transmit a bandwidth request message of a conventional scheme to the base station.

The confirmation of whether the service type is sensitive to delay may include confirming a connection identifier (CID) or a Flow ID allocated to the mobile station.

The service type sensitive to delay may include a real-time polling service (rtPS).

The shift of the phase of the fast feedback channel and transmission of the phase-shifted fast feedback channel may include multiplexing a radio resource allocation request signal with the phase-shifted fast feedback channel.

The bandwidth request message may include any one of codewords mapped to a plurality of bandwidth request profiles according to the service type. The codewords may be mapped to at least one profile selected according to traffic priority among predetermined bandwidth request profiles. The codewords may include a separator bit for distinguishing between a bandwidth request and other purposes.

The method may further include negotiating a codeword transmission interval for a bandwidth request through a dynamic service addition request/response message with the base station.

The transmission of the bandwidth request message to the base station may include transmitting, to the base station through the fast feedback channel, any one of codewords mapped to a plurality of bandwidth request profiles according to the service type every negotiation interval.

The dynamic service addition request/response message may further include either an offset or a start frame number of a start position for transmitting the codeword.

If the codeword transmission interval for the bandwidth request is changed, the method may further include negotiating the changed interval with the base station through a dynamic service change request/response message.

In another aspect of the present invention, provided herein is a method for transmitting uplink data according to a dynamic resource request by requesting an uplink bandwidth by a contention-free request scheme in a mobile station. The method includes confirming whether a service type for a bandwidth request is sensitive to delay, if the service type is not sensitive to delay, requesting a base station to allocate a radio resource using a codeword for a bandwidth request of a fast feedback channel, if the service type is sensitive to delay or if a bandwidth request grant message is received from the base station in correspondence to the codeword for the bandwidth request, transmitting a bandwidth request information corresponding to the service type to the base station, and upon receiving an uplink grant message for an uplink resource according to the bandwidth request information from the base station, transmitting data though the uplink resource. If the bandwidth request grant message is received from the base station in correspondence to the codeword for the bandwidth request, the mobile station may transmit a bandwidth request message of a conventional scheme to the base station.

The bandwidth request message may include any one of codewords mapped to a plurality of bandwidth request profiles according to the service type.

Advantageous Effects

According to the present invention, the following advantages are obtained.

First, collision does not occur during a resource request.

Second, quality of service (QoS) of real-time traffic sensitive to delay can be satisfied.

Third, message overhead can be reduced by dynamically changing an uplink allocation request procedure according to a service type.

Fourth, resources can be efficiently used according to a characteristic of a service provided to an MS.

The present invention is not limited to the above-described effects and other effects which are not described will be clearly understood by persons skilled in the art from the following description.

BRIEF DESCRIPTION OF DRAWINGS

The accompanying drawings, which are included to provide a further understanding of the invention, illustrate embodiments of the invention and together with the description serve to explain the principle of the invention.

In the drawings.

MODE FOR THE INVENTION

Figure 1:
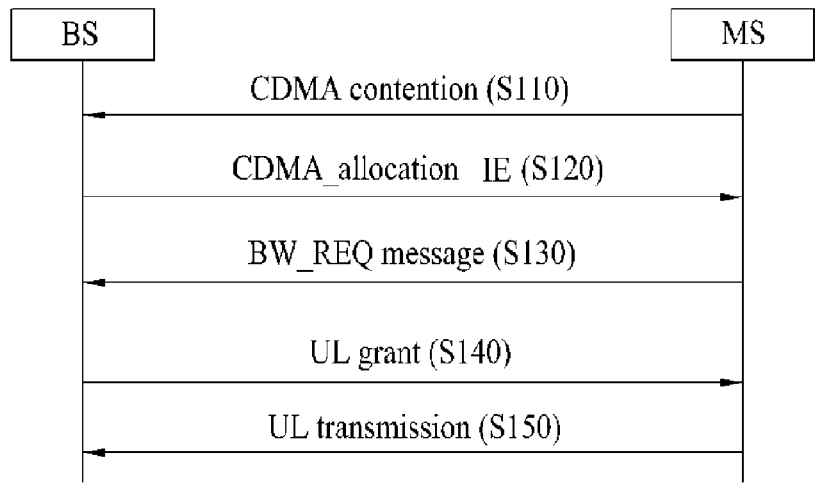
FIG. 1 illustrates an uplink resource allocation procedure for an MS using a contention-based request scheme.

The present invention provides a wireless access system. Hereinafter, exemplary embodiments of the present invention will describe methods for efficiently transmitting uplink data.

The embodiments described below are provided by combining components and features of the present invention in specific forms. The components or features of the present invention can be considered optional if not explicitly stated otherwise. The components or features may be implemented without being combined with other components or features. The embodiments of the present invention may also be provided by combining some of the components and/or features. The order of operations in the embodiments of the present invention may be changed. Some components or features of one embodiment may be included in another embodiment or may be replaced with corresponding components or features of another embodiment.

In a description of the drawings, procedures or steps which may obscure the subject matter of the present invention will not be described and procedures or steps which can be understood by those skilled in the art will also be omitted.

The embodiments of the present invention will be described focusing on the data communication relationship between a base station and a mobile station. Here, the base station refers to a terminal node of a network communicating directly with the mobile station. In some cases, a specific operation described as being performed by the base station may be performed by an upper node of the base station.

Namely, it is apparent that the base station or any other network nodes may perform various operations for communication with the terminal in a network comprised of a plurality of network nodes including base stations. The term base station may be replaced with the term fixed station, Node B, eNode B (eNB), access point, etc. The term mobile station may be replaced with the term user equipment (UE), subscriber station (SS), mobile subscriber station (MSS), mobile terminal, terminal etc.

A transmitting end refers to a fixed and/or mobile node which transmits a data service or a voice service and a receiving end refers to a fixed and/or mobile node which receives a data service or a voice service. Therefore, in uplink, a mobile station may correspond to the transmitting end and a base station may correspond to the receiving end. Similarly, in downlink, the mobile station may correspond to the receiving end and the base station may correspond to the transmitting end.

A mobile station employed in the present invention may be a personal digital assistant (PDA), a cellular phone, a personal communication service (PCS) phone, a global system for mobile (GSM) phone, a wideband code division multiple access (wide CDMA) phone, a mobile broadband system (MBS) phone, etc. The mobile station may also be a handheld personal computer (PC), a notebook PC, a smart phone, a multimode multiband (MM-MB) terminal, etc.

Here, the smart phone refers to a mobile station mixing advantages of a mobile communication terminal and a PDA and may mean a mobile station integrating a data communication function of the PDA, such as schedule management, facsimile transmission and reception, and Internet access into the mobile communication terminal. The MM-MB terminal refers to a terminal having a multimodem chip therein and operating in a mobile Internet system and other mobile communication systems (e.g., CDMA 2000 system, wideband CDMA system, etc.).

The embodiments of the present invention may be implemented by various means, for example, hardware, firmware, software, or a combination thereof.

In a hardware configuration, methods according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Software code may be stored in a memory unit so as to be driven by a processor. The memory unit is located at the interior or exterior of the processor and may transmit data to and receive data from the processor via various known means.

The embodiments of the present invention can be supported by standard documents of at least one of the IEEE 802 system, the $3^{rd}$ generation partnership project (3GPP) system, the 3GPP long term evolution (LTE) system, and the 3GPP2 system which are radio access systems. That is, steps or portions that are not described in the embodiments of the present invention for the sake of clearly describing the spirit of the present invention can be supported by the above documents. For all terms used in this disclosure, reference can be made to the above standard documents. Especially, the embodiments of the present invention can be supported by at least one of P802.16-2004, P802.16e-2005, and P802.16Rev2 which are standards documents of the IEEE 802.16 system.

Reference will now be made in detail to the exemplary embodiments of the present invention in conjunction with the accompanying drawings. The detailed description, which will be given below with reference to the accompanying drawings, is intended to explain exemplary embodiments of the present invention, rather than to show the only embodiments that can be implemented according to the invention.

In addition, the specific terms used in the embodiments of the present invention are provided to aid the understanding of the present invention and those terms may be changed to other forms without departing from the spirit of the present invention.

A mobile station (MS) may perform a bandwidth request using a codeword of a fast feedback channel.

Figure 3:
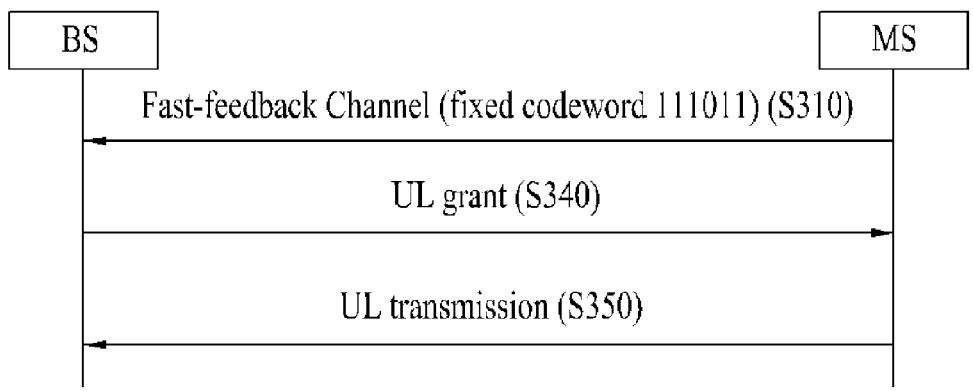
FIG. 3 illustrates an uplink resource allocation procedure for an MS using a codeword of a fast feedback channel in a contention-free request scheme.

FIG. 3 illustrates an uplink resource allocation procedure for an MS using a codeword of a fast feedback channel in a contention-free request scheme.

A real-time polling service (rtPS) refers to an uplink scheduling type of an MS for periodically requesting data of a variable size, such as moving pictures experts group (MPEG) video, in real-time. The MS receiving rtPS may perform an uplink resource allocation request using a predetermined specific codeword (e.g., 111011) of a fast feedback channel.

First, the MS receiving rtPS performs an uplink resource request using a codeword 111011 used for a bandwidth request in a fast feedback channel (S310).

If a bandwidth of a maximum sustained traffic rate determined in a registration process or a dynamic service connection process is available, a base station (BS) receiving a corresponding request allocates an uplink resource (S340). The MS transmits corresponding data to an uplink region allocated by the BS (S350).

However, in such a method using a fixed codeword, the BS recognizes the requested bandwidth as a bandwidth of a maximum sustained traffic rate. Even through an actually required bandwidth is less than or greater than the bandwidth of the maximum sustained traffic rate, since the BS cannot confirm the actually required bandwidth, the BS determines only whether the bandwidth of the maximum sustained traffic rate is available and allocates only a bandwidth corresponding thereto.

Hereinafter, a method is proposed for efficiently performing, at an MS, an uplink resource request in order to transmit signaling or traffic sensitive to delay to an uplink.

Bandwidth request profiles may be defined using information such as bandwidth, quality of service (QoS) class, traffic type, etc. to be requested by the MS. The profiles may be transmitted to the MS by the BS in the form of system information or may be included within the MS. The BS and MS may negotiate such profiles through a dynamic service addition request/response message or a dynamic service change request/response message.

Table 1 listed below shows an example of profiles defined in consideration of a bandwidth and a traffic type to be requested.

TABLE 1

| Index | Definition |
|---|---|
| 000 | 1M (bytes) for FTP |
| 001 | 1.5M (bytes) for FTP |
| 010 | 2M (bytes) for FTP |
| ... | ... |
| 101 | 4000 (bytes) for Video Telephony |
| 110 | 6000 (bytes) for Video Telephony |
| 111 | 8000 (bytes) for Video Telephony |

The MS transmits a codeword mapped to an index number of a profile through a fast feedback channel and the BS allocates corresponding bandwidth with reference to the transmitted codeword. The codeword may be transmitted using the same method as a channel quality indicator (CQI) or acknowledgement (ACK) transmission method. The profiles are not limited to those shown in Table 1 and may be defined in various forms.

Figure 4:
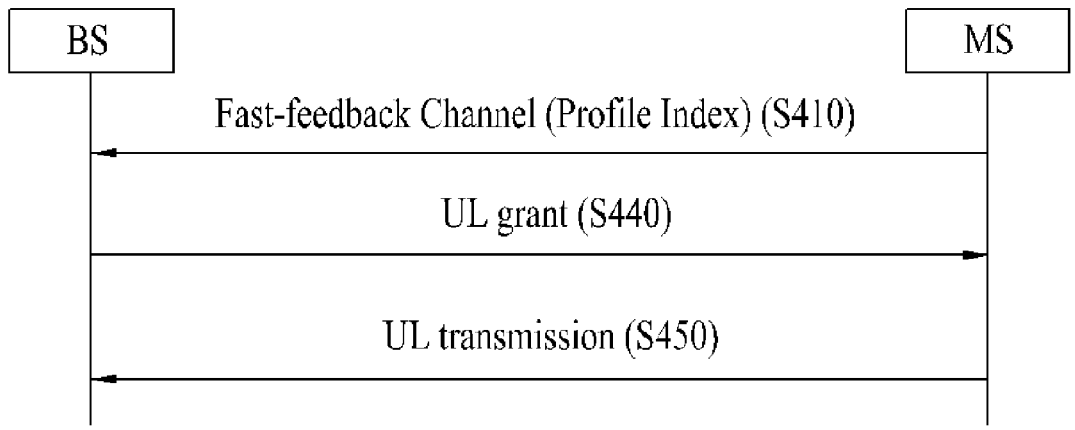
FIG. 4 illustrates an example of an uplink resource allocation procedure applied to the present invention.

FIG. 4 illustrates an example of an uplink resource allocation procedure applied to the present invention.

An MS selects a profile index approximating to a characteristic of a service to be requested and transmits a corresponding codeword through a fast feedback channel (S410).

A BS confirms a profile corresponding to the cordword, and if a bandwidth of the corresponding profile is available, the BS allocates an uplink resource (S440).

Thereafter, the MS transmits corresponding data to an uplink region allocated by the BS (S450).

Meanwhile, for a bandwidth request, a codeword mapped to a profile index may be independently transmitted using a different region or different spread code from a CQI channel or an ACK channel. Further, the codeword mapped to the profile index for a bandwidth request may be transmitted instead of a CQI or ACK using a previously allocated CQI channel or ACK channel.

According to the exemplary embodiment of the present invention, a part of codewords different from CQI or ACK information may be used for profile indices.

Figure 5:
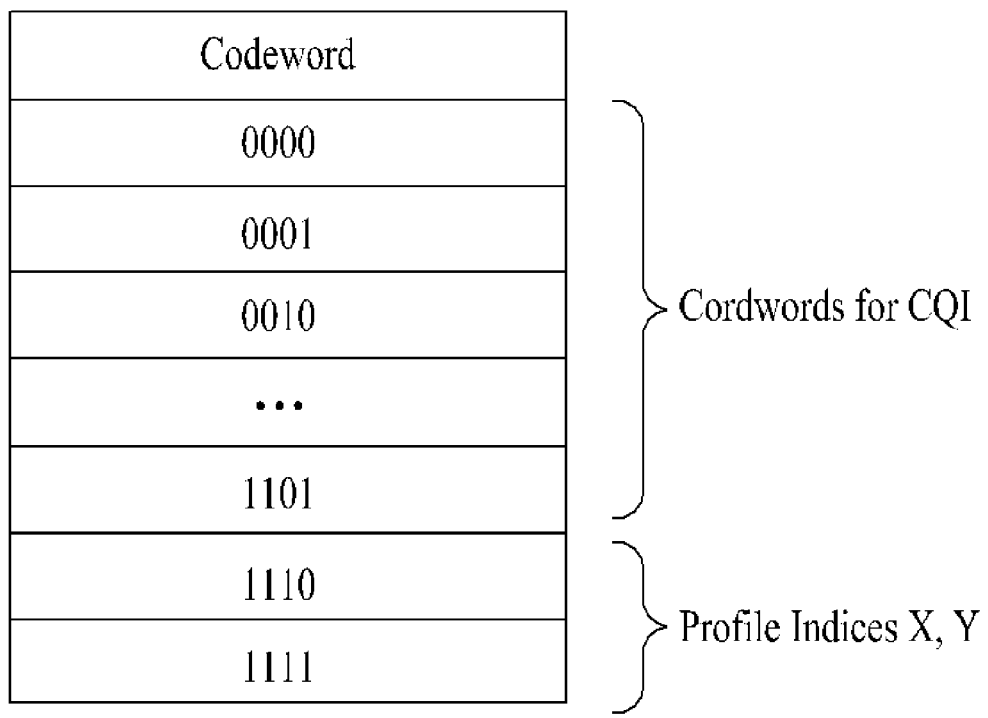
FIG. 5 illustrates an example of multiplexing a part of all codewords for a bandwidth request with codewords for a CQI.

FIG. 5 illustrates an example of multiplexing a part of all codewords for a bandwidth request with codewords for a CQI.

In this case, profile indices to use limited codewords in a profile list may be determined by the following rule.

First, traffic having the highest priority, that is, traffic sensitive to delay is selected among traffic types connected through a dynamic service addition request/response (DSA-REQ/RSP) or a dynamic service change request/response (DSC-REQ/RSP).

Next, assuming that a profile index having an average bandwidth considering a characteristic of the selected traffic is profile index$_{mean}$, profile indices selected according to a process shown in the following Table 2 may be sequentially mapped.

TABLE 2 case 0 : { profile index$_{mean}$ − 1, profile index$_{mean}$ }
case 1 : { profile index$_{mean}$, profile index$_{mean}$ + 1}
...
case 11 : { profile index$_{mean}$ − 1, profile index$_{mean}$, profile index$_{mean}$ + 1}
case 12 : { profile index$_{mean}$ − 2, profile index$_{mean}$, profile index$_{mean}$ + 2}
...

The above process may be repeated until all codewords of a CQI or ACK channel are filled.

The process shown in Table 2 is just one example and various methods for mapping profile indices may be considered. Such methods may be determined during a cell planning process to be included in an MS or may be transmitted to the MS by the BS. The BS and MS may negotiate such profiles through a dynamic service addition request/response message or a dynamic service change request/response message Meanwhile, a separator bit may be used to transmit profile indices.

Figure 6:
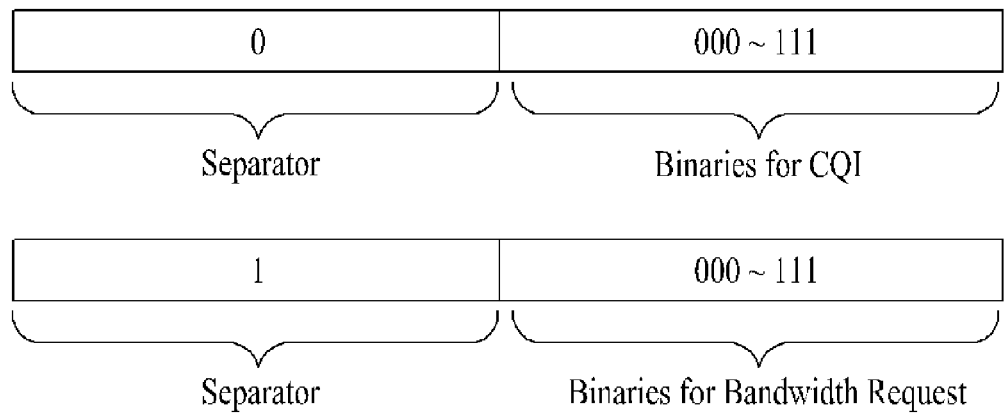
FIG. 6 illustrates an example of multiplexing a profile index with a CQI using a 4-bit codeword including a separator bit.

FIG. 6 illustrates an example of multiplexing a profile index with a CQI using a 4-bit codeword including a separator bit.

Upon transmitting CQI information through a fast feedback channel, an MS may set a separator bit to 0 and upon transmitting a profile index, the MS may set the separator bit to 1. A BS can determine whether received information is information about a profile index by confirming the separator bit. For example, if a 4-bit codeword is used, the MS may represent 8 profile indices and 8 CQIs. A profile index request scheme using the separator bit may be employed irrespective of traffic type.

Figure 7:
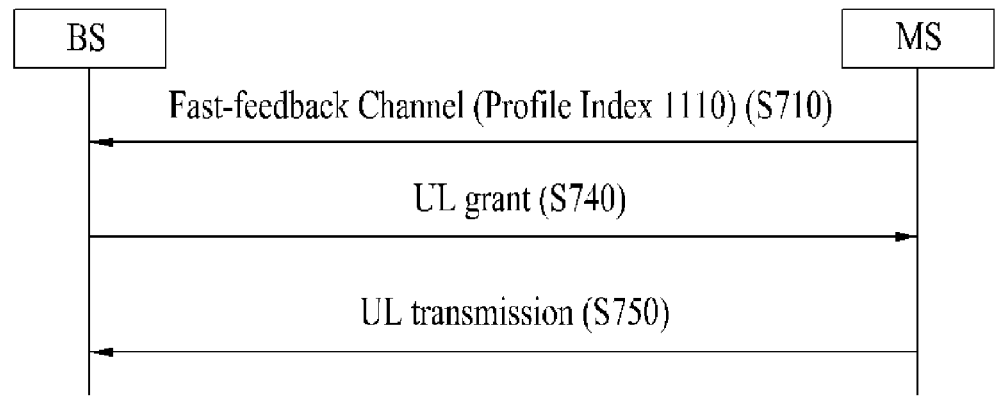
FIG. 7 illustrates an example in which an MS which desires to receive a video telephony service of 5500 bytes performs a bandwidth request using a separator with respect to a BS.

FIG. 7 illustrates an example in which an MS which desires to receive a video telephony service of 5500 bytes performs a bandwidth request using a separator bit with respect to a BS.

In Table 1, profiles of a video telephony service are defined in indices "101" to "111" Among these, since a profile index corresponding to a minimum size satisfying 5500 bytes is "110", the MS transmits a codeword "1110" (including a separator bit "1" indicating that a profile index is transmitted and "111" denoting a specific profile) to the BS.

Meanwhile, profile indices may be periodically transmitted.

Especially, the MS receiving a service with periodicity such as an rtPS can obtain a resource by periodically transmitting profile indices.

For example, a CQI is generally transmitted through a resource allocated to transmit the CQI and a profile index for a bandwidth request may be transmitted at a specific time point known to both the BS and the MS. In this case, a periodic profile index bandwidth request scheme may express more profiles than a separator profile index bandwidth request scheme. For example, when a 4-bit codeword is used, the separator profile index bandwidth request scheme can express 8 profile indices and 8 CQIs, while the periodic profile index bandwidth request scheme can express 16 profile indices and 16 CQIs.

To perform the periodic profile index bandwidth request scheme, a start time for transmitting a profile index through a fast feedback channel and a transmission period of the profile index are exchanged through a medium access control (MAC) message between the MS and the BS. The MAC message may be exchanged in a process of creating a service flow. The start time for transmitting the profile index through the fast feedback channel may be expressed as an offset or a start frame number etc.

Hereinafter, the dynamic service addition request/response (DSA-REQ/RSP) and the dynamic service change request/response (DSC-REQ/RSP) are considered as an example of the MAC message exchanged between the MS and the BS.

The following Table 3 shows an example of service flow management encodings to be added to perform a periodic profile index bandwidth request.

TABLE 3

| NameÐ | Length | Value | Scope |
|---|---|---|---|
| BR Interval | 2 | Milliseconds | DSA-REQ, DSA-RSP, DSC-REQ, DSC-RSP |
| BR Offset | 1 | Count | DSA-REQ, DSA-RSP, DSC-REQ, DSC-RSP |
| BR Start Frame Number | 1 | Represents the 8 least significant bits of the absolute frame number | DSA-REQ, DSA-RSP, DSC-REQ, DSC-RSP |

A value of a bandwidth request (BR) interval is determined in consideration of a CQI or ACK transmission interval. For example, a BR interval may be 10 ms or 50 ms.

Figure 8:
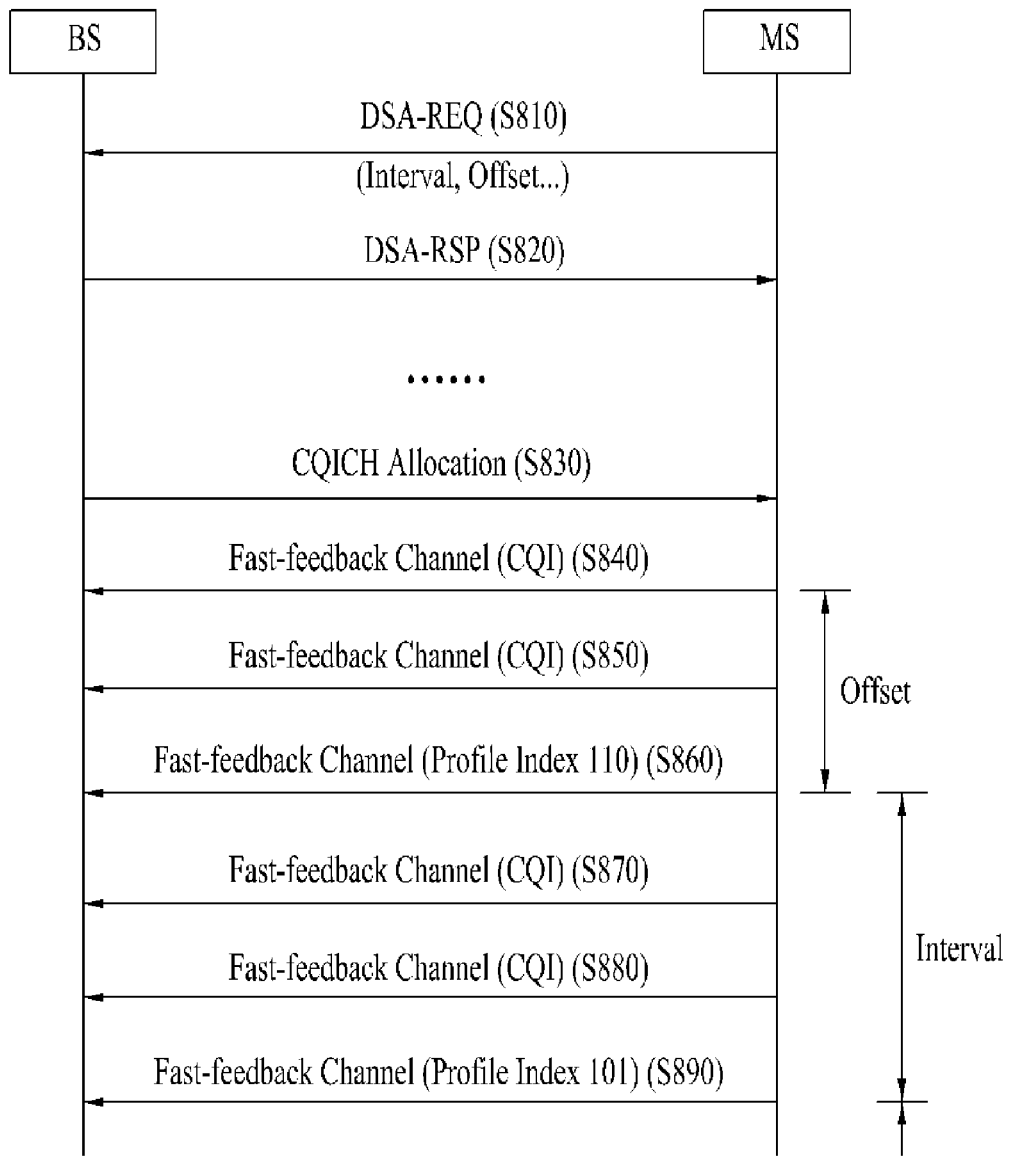
FIG. 8 illustrates an example in which an MS informs a BS of offset information and periodically transmits a profile index in the present invention.

FIG. 8 illustrates an example in which an MS informs a BS of offset information and periodically transmits a profile index through a channel quality indicator channel (CQICH) in the present invention.

It is assumed that a service provided to the MS has high periodicity such as a video telephony service.

The MS transmits a dynamic service addition request (DSA-REQ) message to the BS to create a new service flow (S810). The BS then transmits a dynamic service addition response (DSA-RSP) message to the MS (S820). The dynamic service addition request (DSA-REQ) message includes an interval, offset, etc. for transmitting a profile index for a bandwidth request by the MS. In this case, the service addition request (DSA-REQ) message may be transmitted by the BS as well as the MS.

The BS allocates a CQICH to the MS (S830) and the MS transmits CQI information through the allocated CQICH (S840 and S850).

Next, the MS transmits a profile index for a bandwidth request to the BS from a time point separated by a bandwidth request offset from a CQICH allocation time point (S860). In FIG. 8, the transmitted profile index is "110".

The MS transmits the CQI information through the allocated CQICH until the interval for transmitting the profile index (S870 and S880).

The MS transmits the profile index for a bandwidth request every profile index transmission period (S890). In FIG. 8, the profile index transmitted at the first interval is "101".

Figure 9:
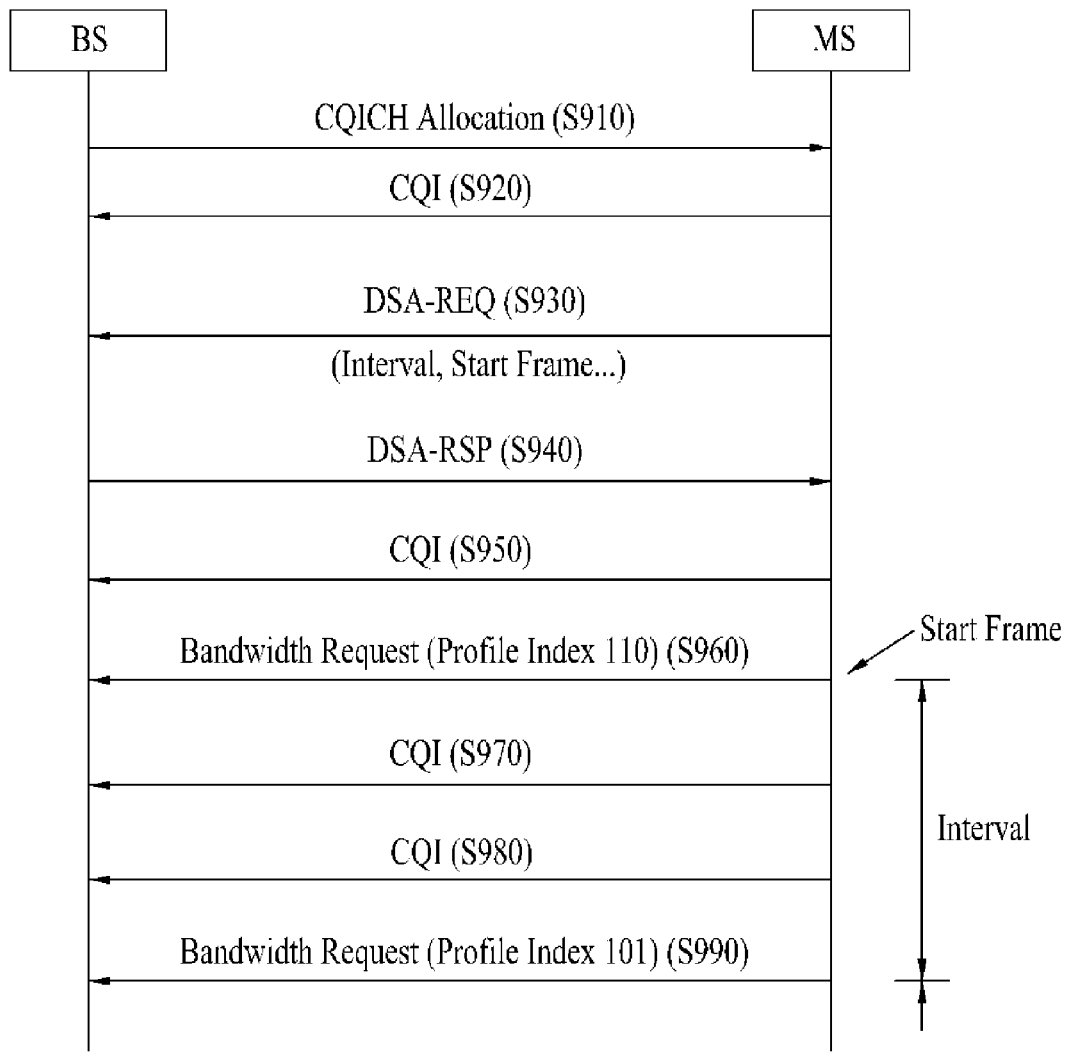
FIG. 9 illustrates an example in which an MS informs a BS of a start frame number and then periodically transmits a profile index in the present invention.

FIG. 9 illustrates an example in which an MS and a BS negotiate a start frame number and then the MS periodically transmits a profile index through a CQICH in the present invention.

The BS allocates a CQICH to the MS (S910 and S920) and the MS transmits a dynamic service addition request (DSA-REQ) message to the BS to create a new service flow (S930). The dynamic service addition request (DSA-REQ) message includes an interval or a start frame for transmitting a profile index for a bandwidth request by the MS.

The BS transmits a dynamic service addition response (DSA-RSP) message to the MS (S940).

The MS transmits CQI information through the allocated CQICH (S950, S970, and S980).

In such processes, the MS transmits a profile index for a bandwidth request to the BS from a time point corresponding to a bandwidth request start frame number (S960). In FIG. 9, a transmitted profile index is "110".

The MS transmits a profile index to the BS every profile index transmission interval negotiated by the MS and the BS through the dynamic service addition request (DSA-REQ) message to the BS (S990). In FIG. 9, a profile index transmitted at the first interval is "101".

Figure 10:
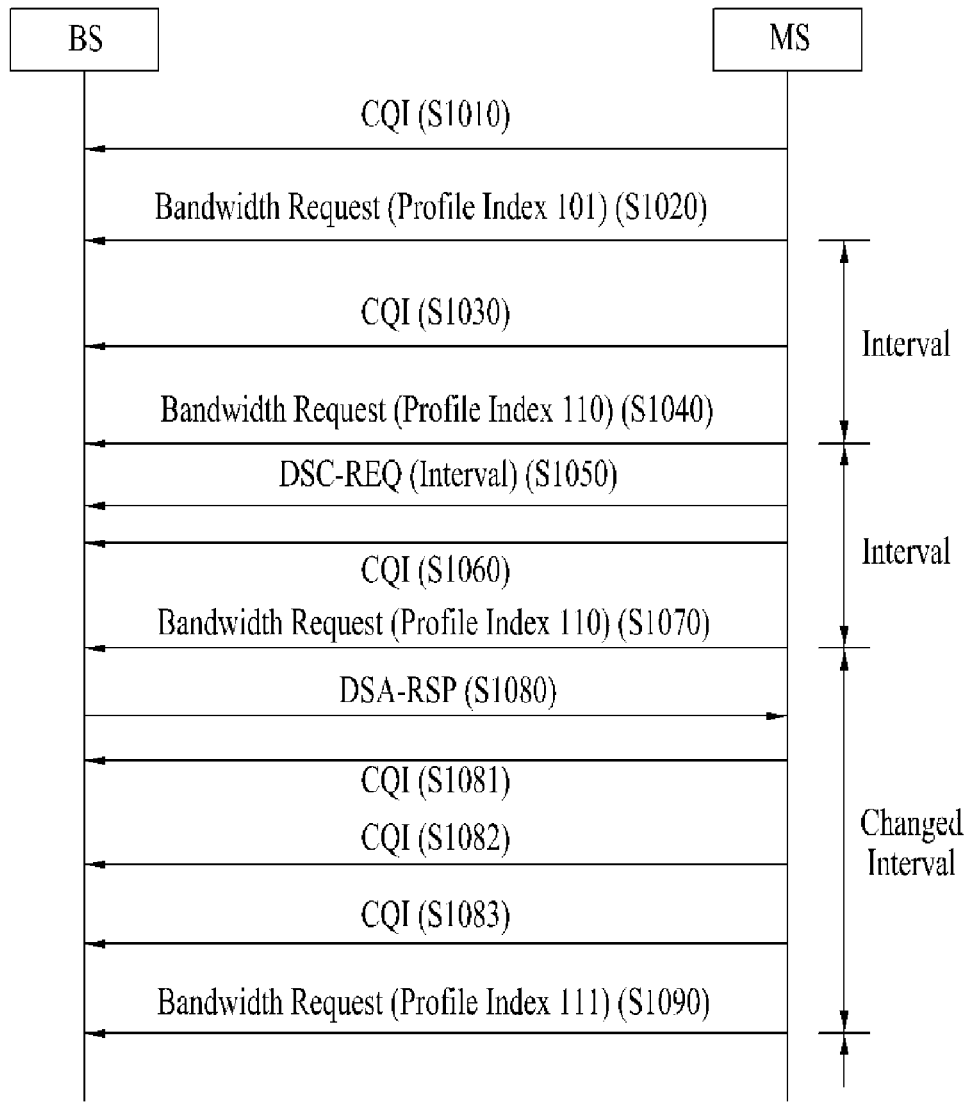
FIG. 10 illustrates an example in which an MS changes a bandwidth request interval in FIG. 9.

FIG. 10 illustrates an example in which an MS changes a bandwidth request interval in FIG. 9.

The MS transmits a CQI (S1010, S1030, and S1060) and transmits profile indices to the BS at regular intervals (S1020, S1040, and S1070). In FIG. 10, the profile indices transmitted at each interval are "101", "110" and "110".

The MS may transmit a dynamic service change request (DSC-REQ) message to the BS to change a transmission interval of a profile index (S1050).

If the MS notifies the BS of a changed interval through the dynamic service change request (DSC-REQ) message, the BS transmits a dynamic service change response (DSC-RSP) message to the MS (S1080).

The MS maintains a previous setting value until the dynamic service change response (DSC-RSP) is received. In this case, a time point for applying the changed interval may be determined using information such as a bandwidth request offset or a bandwidth request start frame number.

After receiving the dynamic service change response (DSC-RSP) message, the MS transmits profile indices to the BS every changed interval (S1090).

In FIG. 10, one profile index is transmitted for one CQI transmission before an interval is changed and one profile index is transmitted for three CQI transmissions (S1081 to S1083) after the interval is changed.

Figure 11:
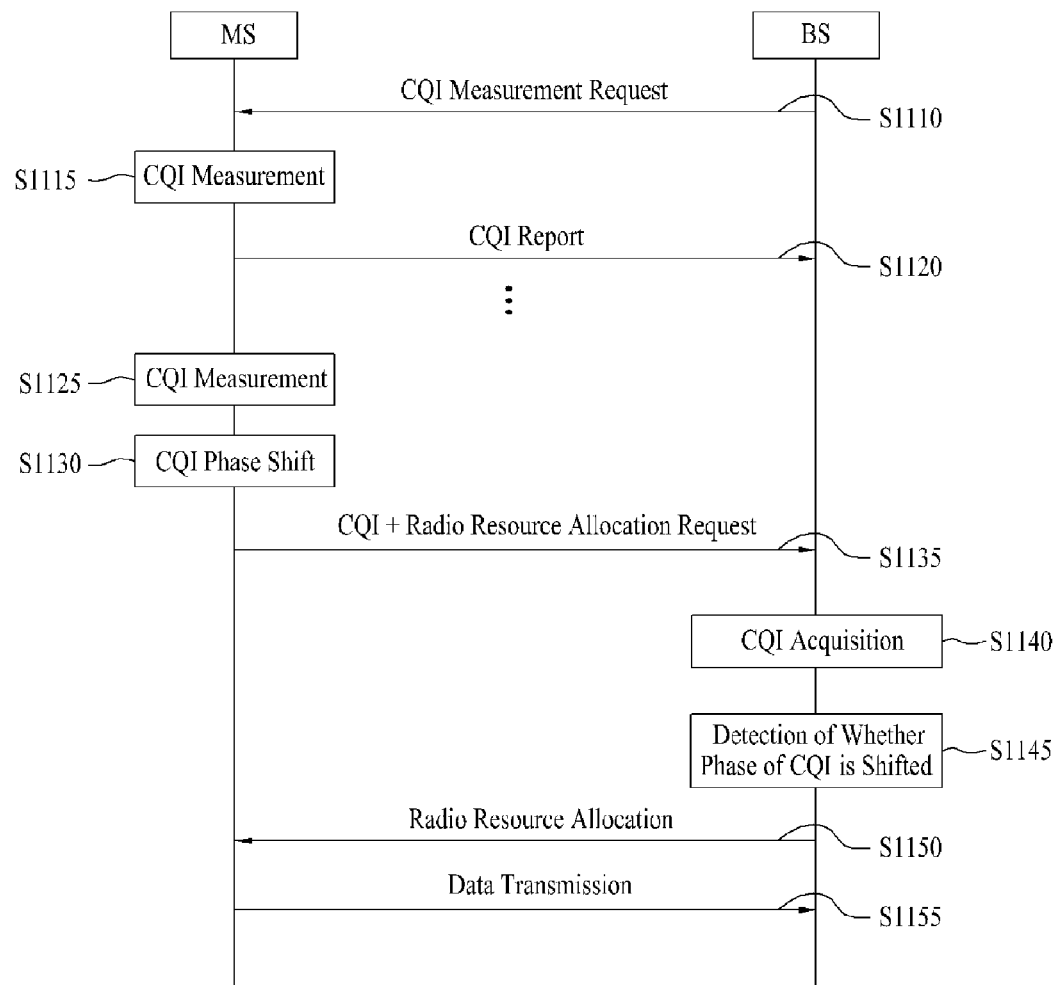
FIG. 11 illustrates another example of an uplink resource allocation procedure applied to the present invention.

FIG. 11 illustrates another example of an uplink resource allocation procedure applied to the present invention.

Referring to FIG. 11, a BS requests an MS to measure CQI (S1110). The request for CQI measurement may be made through a CQI measurement request message. The CQI measurement request message may include information as to a CQI report interval or uplink radio resources for CQI report.

The MS measures the CQI to construct the CQI (S1115). The CQI may be measured through a pilot included in downlink data transmitted from the BS. The CQI refers to information indicating a channel state between the MS and the BS. The CQI may have various forms such as a signal-to-interference plus noise ratio (SINR), a modulation and coding scheme (MCS) level, a data rate indicator, a received signal strength indicator, etc.

The MS reports the CQI to the BS through a CQICH (S1120). The CQICH refers to a channel on which the CQI is conveyed. The MS periodically reports the CQI to the BS according to a CQI measurement interval included in the CQI measurement request message. The MS periodically measures the CQI under the BS's direction and reports the measured CQI to the BS.

To report another CQI, the MS measures the CQI at a proper time to construct the CQI (S1125).

The MS shifts the phase of the CQI for a radio resource allocation request (S1130). In order for the MS to transmit a user signal through an uplink, an uplink radio resource should be allocated to the MS from the BS. While periodically reporting the CQI, the MS shifts the phase of the CQI to request radio resource allocation. Namely, if the CQI is a first control signal and a radio resource allocation request is a second control signal, the MS multiplexes the first and second control signals. In more detail, the MS multiplexes the second control signal with the first control signal by shifting the phase of the first control signal. Accordingly, the phase-shifted first control signal is a multiplexed control signal.

The MS transmits the phase-shifted CQI through the CQICH (S1135). Although the CQICH transmits only the phase-shifted CQI, it may be interpreted that the CQICH transmits two multiplexed control signals. The CQICH includes both an actual CQI value and radio resource allocation request information through the phase-shifted CQI.

The BS acquires the CQI from the CQICH (S1140). To acquire the CQI from the CQICH, a coherent detection scheme or a non-coherent detection scheme may be used. The coherent detection scheme serves to acquire the CQI after channel estimation is performed using a pilot. The non-coherent detection scheme serves to acquire the CQI without channel estimation. Various schemes for obtaining the CQI may be applied in addition to the above schemes.

The BS detects whether the phase of the CQI is shifted (S1145). If phase shift is detected, the BS determines that the MS requests radio resource allocation. The detection of the phase shift may vary according to whether the coherent detection scheme or the non-coherent detection scheme is used.

The BS allocates radio resources to the MS according to the radio resource allocation request (S1150). The MS to which the radio resources are allocated transmits uplink control information (uplink bandwidth request message) or data using the radio resources to the BS (S1155).

The MS shifts the phase of the periodically transmitted CQI included in the CQICH to convey radio resource allocation request information on the CQI. Thus, an additional control channel for the radio resource allocation request is unnecessary. Therefore, control signaling can be reduced.

For example, the CQI may be mapped to data subcarriers of each tile. The following Table 4 shows modulation symbols conveyed on 8 data subcarriers included in one tile.

A modulation symbol is modulated to one subcarrier and 8 modulation symbols conveyed on one tile constitute one vector. There are 8 types of vectors having indices 0 to 7.

TABLE 4

| Vector index | Data subcarrier modulation per codewordSubcarrier(0), Subcarrier(1), . . . , Subcarrier(7) |
|---|---|
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 |

The modulation symbols constituting each vector are shown in the following Math Figure 1.

MathFigure 1

$$P0 = \exp\left(j \cdot \frac{\pi}{4}\right)$$
$$P1 = \exp\left(j \cdot \frac{3\pi}{4}\right)$$
$$P2 = \exp\left(-j \cdot \frac{3\pi}{4}\right)$$
$$P4 = \exp\left(-j \cdot \frac{\pi}{4}\right)$$

[Math. 1]

Vectors having different indices are orthogonal.

If a payload indicating the CQI is 4 bits, vectors allocated to the CQICH may be indicated as shown in the following Table 5.

TABLE 5

| 4-bit payload | Fast feedback vector indices per tileTile(0), Tile(1), . . . , Tile(5) |
|---|---|
| 0b0000 | 0, 0, 0, 0, 0, 0 |
| 0b0001 | 1, 1, 1, 1, 1, 1 |
| 0b0010 | 2, 2, 2, 2, 2, 2 |
| 0b0011 | 3, 3, 3, 3, 3, 3 |
| 0b0100 | 4, 4, 4, 4, 4, 4 |
| 0b0101 | 5, 5, 5, 5, 5, 5 |
| 0b0110 | 6, 6, 6, 6, 6, 6 |
| 0b0111 | 7, 7, 7, 7, 7, 7 |
| 0b1000 | 0, 1, 2, 3, 4, 5 |
| 0b1001 | 1, 2, 3, 4, 5, 6 |
| 0b1010 | 2, 3, 4, 5, 6, 7 |
| 0b1011 | 3, 4, 5, 6, 7, 0 |
| 0b1100 | 4, 5, 6, 7, 0, 1 |
| 0b1101 | 5, 6, 7, 0, 1, 2 |
| 0b1110 | 6, 7, 0, 1, 2, 3 |
| 0b1111 | 7, 0, 1, 2, 3, 4 |

Since one subchannel is allocated to the CQICH, one CQICH includes 6 tiles. One vector is needed to express one tile, so 6 vectors are necessary to indicate the CQI. CQI mapped to a subchannel and expressed in the form of a vector is called a codeword of the CQI. Table 5 shows one example of a combination of vectors per payload. The combination of vectors is not limited to Table 5 and may easily be modified by those skilled in the art.

The vectors of Table 4 according to indices and the combination of vectors of Table 5 according to CQI values are purely exemplary and the number of vector indices or the size of the payload may be changed.

As another example, the CQI may be mapped to pilot subcarriers of each tile. The following Table 6 shows 4 modulation symbols included in one tile. The 4 modulation symbols conveyed on one tile constitute one vector. There are vectors of 4 types.

TABLE 6

| Vector Index | $M_{n,4m}, M_{n,4m+1}, M_{n,4m+2}, M_{n,4m+3}$ Ð |
|---|---|
| 0 | P0, P0, P0, P0 |
| 1 | P0, P2, P0, P2 |
| 2 | P0, P1, P2, P3 |
| 3 | P1, P0, P3, P2 |

Modulation symbols P0, P1, P2, and P3 constituting each vector are as indicated by the above Math Figure 1.

If a payload of the CQI is 4 bits, vectors allocated to the CQICH may be indicated by the following Table 7.

TABLE 7

| Four-bit payload(binary) | Vector indices per tileTile(0), Tile(1), Tile(2), Tile(3), Tile(4), Tile(5) |
|---|---|
| 0000 | 0, 0, 0, 1, 1, 1 |
| 0001 | 1, 1, 1, 0, 0, 0 |
| 0010 | 2, 2, 2, 3, 3, 3 |
| 0011 | 3, 3, 3, 2, 2, 2 |
| 0100 | 0, 1, 2, 3, 0, 1 |
| 0101 | 1, 2, 3, 0, 1, 3 |
| 0110 | 2, 3, 0, 1, 2, 3 |
| 0111 | 3, 0, 1, 2, 3, 0 |
| 1000 | 0, 0, 1, 3, 2, 2 |
| 1001 | 1, 3, 2, 2, 3, 1 |
| 1010 | 2, 2, 3, 1, 0, 0 |
| 1011 | 3, 3, 1, 0, 1, 1 |
| 1100 | 0, 0, 3, 2, 0, 3 |
| 1101 | 1, 2, 0, 2, 2, 0 |
| 1110 | 2, 1, 3, 3, 1, 2 |
| 1111 | 3, 2, 2, 1, 1, 2 |

Since one subchannel is allocated to the CQICH, one CQICH includes 6 tiles. One vector is needed to express one tile, so 6 vectors are necessary to indicate the CQI.

As still another example, the CQI may be mapped to both data subcarriers and pilot subcarriers of each tile. Although Table 5 shows mapping of the CQI to the data subcarriers of a tile and Table 7 shows mapping of the CQI to the pilot subcarriers of a tile, the CQI may be mapped to both the data subcarriers and the pilot subcarriers.

As described above, the CQICH may be mapped to a fast feedback channel for transmission.

The phase shift of the CQI will now be described.

The modulation symbols for expressing the CQI are indicated in Math Figure 1.

To shift the phase of the CQI, phase shift value is multiplied by each modulation symbol. This may be indicated by the following Math Figure 2.

Figure 2:
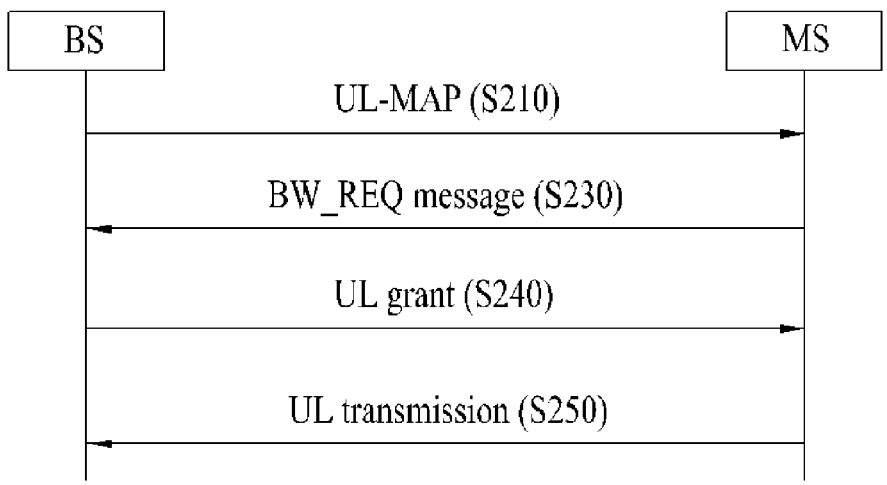
FIG. 2 illustrates an uplink resource allocation procedure for an MS using polling in a contention-free request scheme.

Math Figure 2

$$P0_{ps}=p0^{j\theta}\ P1_{ps}=p1^{j\theta}$$
$$P2_{ps}=p2^{j\theta}\ P3_{ps}=p3^{j\theta} \quad [\text{Math.2}]$$

where

θ denotes a phase shift value. For example, in order to shift a phase by a phase shift value $$\theta=\pi/4,$$

$$\exp(j\pi/4)$$

is multiplied by each modulation symbol.

If the MS requests radio resource allocation, phase shift is multiplied by a modulation symbol to construct the CQI and the CQI is transmitted through the CQICH. If a codeword of the CQI is $C_0$ and the phase shift of the CQI is E, a reception signal y received by the BS is as indicated by the following Math Figure 3 when dis regarding noise.

Math Figure 3

$$y=HC_0E \quad [\text{Math.3}]$$

where H denotes a channel.

In coherent detection, respective tiles are distributed over all bands and the BS can obtain a value of the channel H by channel estimation. $C_0E$ can be acquired by compensating for the channel H with respect to the reception signal y. If a payload of the CQI is 4 bits, there are 16 codewords. If correlation values for all the codewords are calculated, a codeword having the highest correlation value can be obtained and the codeword having the highest correlation value is $C_0$. This is because vectors having different indices are orthogonal and orthogonality is maintained even if the same phase shift is performed. If $C_0$ is obtained, since the phase shift E can be acquired, the BS can detect whether a phase is shifted from the reception signal. If the phase of the CQI is shifted, the BS can recognize that the MS transmitting a corresponding CQI requests radio resource allocation.

In non-coherent detection, since the BS does not perform channel estimation, a value of the channel H cannot be known. However, since the size of one tile in time and frequency is not substantial, a channel variation within one tile may be limited. Since 8 vectors may be mapped to one tile as shown in Table 7, an index of a vector having the highest correlation value obtained by performing correlation between vectors can be acquired. In this way, indices of 6 vectors having the highest correlation value for 6 tiles constituting a subchannel are sequentially obtained. When comparing sequences for the indices of the 6 vectors with the sequences of Table 7, the approximating codeword $C_0$ may be found, thereby detecting the CQI. If the codeword $C_0$ is obtained, it can be detected whether the phase of the CQI is shifted. If the phase of the CQI is shifted, the BS can recognize that the MS transmitting a corresponding CQI requests radio resource allocation. In addition to the above-described detection scheme, other coherent or non-coherent detection schemes may be used.

Figure 12:
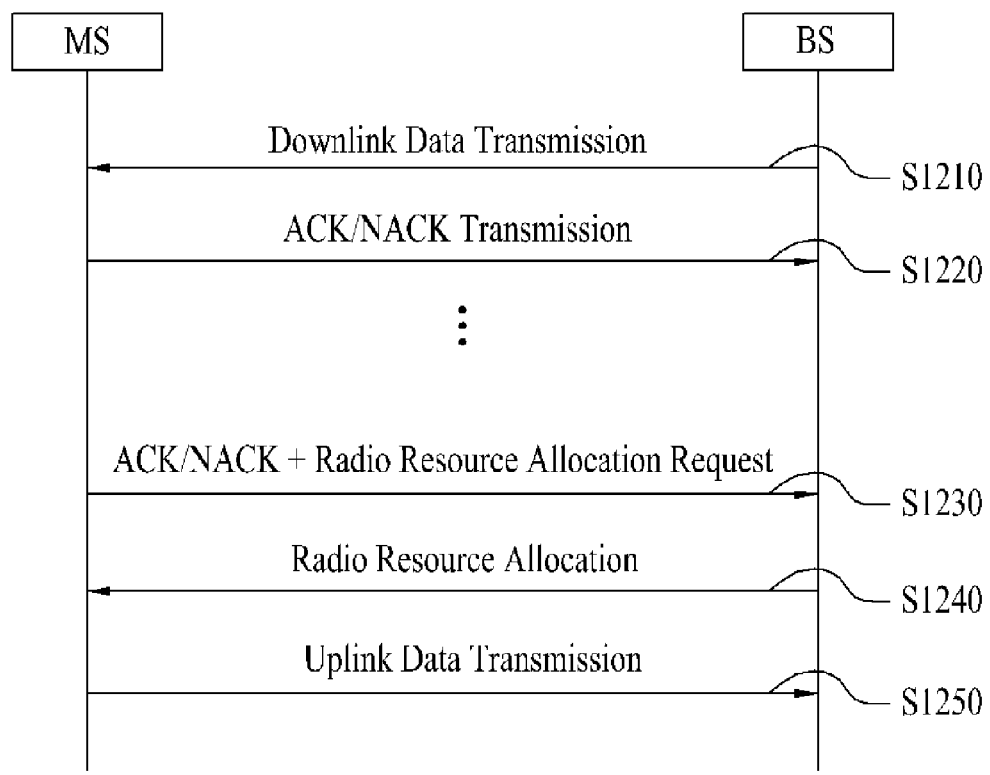
FIG. 12 illustrates an example of applying the procedure of FIG. 11 to an acknowledgement channel.

FIG. 12 illustrates an example of applying the procedure of FIG. 11 to an acknowledgement channel.

FIG. 12 applies to a data transmission method using a hybrid automatic repeat request (HARQ) scheme.

Referring to FIG. 12, a BS transmits downlink data (S1210). An MS receives and decodes the downlink data and detects whether an error occurs. If no errors are detected, the MS transmits an acknowledgment (ACK) signal and if errors are detected, the MS transmits a negative acknowledgement (NACK) signal (S1220). A channel transmitting the ACK/ NACK signal is called an ACK/NACK channel. ½ of a subchannel may be allocated as the ACK/NACK channel.

Table 8 shows 8 modulation symbols included in one tile used for the ACK/NACK channel. The 8 modulation symbols conveyed on one tile constitute one vector. There are 8 types of vectors.

TABLE 8

| Vector index | $M_{n,8m}, M_{n,8m+1}, M_{n,8m+2}, \ldots, M_{n,8m+7}$ Ð |
|---|---|
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 |

Modulation symbols P0, P1, P2, and P3 constituting each vector are as indicated by Math Figure 1.

If a payload of an ACK/NACK signal is one bit (e.g., the payload of "0" indicates the ACK signal and the payload of "1" indicates the NACK signal), vectors allocated to the ACK/NACK channel may be indicated by the following Math Figure 9. Since ½ of a subchannel is allocated to the ACK/ NACK channel, one ACK/NACK channel includes 3 tiles. One vector is needed to express one tile, so 3 vectors are required to indicate the ACK/NACK signal.

TABLE 9

| ACK 1-bit symbol | Vector indices per tile Tile(0), Tile(1), Tile(2) |
|---|---|
| 0 | 0, 0, 0 |
| 1 | 4, 7, 2 |

Upon receiving the ACK signal as a response to the downlink data, the BS transmits the next downlink data. Upon receiving the NACK signal, the BS transmits re-transmission data again. The re-transmission data may be the same as or different from the original downlink data. The BS may attempt to re-transmit the re-transmission data a given number of times.

To request radio resource allocation, the MS shifts the phase of the ACK/NACK signal and transmits the phase-shifted ACK/NACK signal to the BS through the ACK/NACK channel (S1230). In order for the MS to transmit a user signal through an uplink, uplink radio resources should be allocated to the MS from the BS. When transmitting the ACK/NACK signal, the MS multiplexes a radio resource allocation request by shifting the phase of the ACK/NACK signal. Namely, if the ACK/NACK signal is a first control signal and the radio resource allocation request is a second control signal, the MS multiplexes the first and second control signals. The ACK/ NACK channel includes both an actual ACK/NACK value and radio resource allocation request information through the phase-shifted ACK/NACK signal.

Multiplexing of the ACK/NACK signal and the radio resource allocation request will now be described in more detail. In the ACK/NACK signal, ACK and NACK may be variously expressed and a signal in which the radio resource allocation request is multiplexed may be variously represented according to the expression of the ACK and NACK.

Table 10 shows an example of a method for transmitting the ACK/NACK signal and the radio resource allocation request.

TABLE 10

| Ð | ACK | NACK |
|---|---|---|
| No Bandwidth Request | Null | Data + Pilot |
| Multiplexing Bandwidth Request | Pilot only | −Data + Pilot |

If the radio resource allocation request is not multiplexed with the ACK/NACK signal, that is, if there is no bandwidth request, a null signal is transmitted for the ACK signal and data and a pilot are transmitted for the NACK signal. Since a probability of generating the ACK signal rather than the NACK signal is high, the MS may minimize an interference signal by transmitting signals only for the NACK signal without transmitting signals for the ACK signal. Alternatively, the MS may transmit signals only for the ACK signal without transmitting signals for the NACK signal.

If the radio resource allocation request is multiplexed with the ACK/NACK signal, that is, if there is a multiplexing bandwidth request, only the pilot is transmitted for the ACK signal and phase-shifted data and the pilot are transmitted for the NACK signal. That is, for the ACK signal, a null symbol is conveyed on a data subcarrier of the ACK/NACK channel and the pilot is conveyed on a pilot subcarrier. For the NACK signal, phase-shifted modulation symbols are conveyed on the data subcarrier of the ACK/NACK channel and the pilot, the phase of which is not shifted, is conveyed on the pilot subcarrier. Data may be phase-shifted as indicated by Math Figure 2 and then transmitted. Although the phase of the data is shifted by 180 degrees, a phase shift value is not limited thereto.

The following Table 11 shows another example of the method for transmitting the ACK/NACK signal and the radio resource allocation request.

TABLE 11

| Ð | ACK | NACK |
|---|---|---|
| No Bandwidth Request | Data + Pilot | −Data + Pilot |
| Multiplexing Bandwidth Request | j Data + Pilot | −j Data + Pilot |

If the radio resource allocation request information is not multiplexed with the ACK/NACK signal, that is, if there is no bandwidth request, data and a pilot are transmitted for the ACK signal and phase-shifted data and the pilot are transmitted for the NACK signal. Namely, the ACK and NACK signals may use the same codeword and the ACK and NACK signals may be discriminated by the phase of the codeword. Alternatively, the phase-shifted data may be transmitted for the ACK signal and the data without shifting phase may be transmitted for the NACK signal.

If the radio resource allocation request is multiplexed with the ACK/NACK signal, that is, if there is a multiplexing bandwidth request, the phase-shifted data and the pilot without shifting phase are transmitted for the ACK signal and the phase-shifted data and the pilot without shifting phase are transmitted for the NACK signal. Here, a first phase-shifted value for distinguishing between the ACK and NACK signals and a second phase-shifted value indicating multiplexing of the radio resource allocation request have different values, that is, 180 degrees and −90 degrees, respectively. However, the first and second phase-shifted values may have the same value according to a modulation scheme or the magnitude of a phase shift value.

The following Table 12 shows still another example of the method for transmitting the ACK/NACK signal and the radio resource allocation request.

TABLE 12

| Ð | ACK | NACK |
|---|---|---|
| No Bandwidth Request | Data 1 + Pilot | Data 2 + Pilot |
| Multiplexing Bandwidth Request | −Data 1 + Pilot | −Data 2 + Pilot |

If the radio resource allocation request is not multiplexed with the ACK/NACK signal, that is, if there is no bandwidth request, first data and a pilot are transmitted for the ACK signal and second data and the pilot are transmitted for the NACK signal. The first and second data may be orthogonal to each other. The first and second data may be distinguished using different codewords.

If the radio resource allocation request is multiplexed with the ACK/NACK signal, that is, if there is a multiplexing bandwidth request, the phase-shifted first data and the pilot without shifting phase are transmitted for the ACK signal and the phase-shifted second data and the pilot without shifting phase are transmitted for the NACK signal. Here, the phase-shifted values of the first and second data are indicated as 180 degrees but the phase-shifted values are not limited thereto.

As described above, when multiplexing the radio resource allocation request by shifting the phase of the ACK/NACK signal, only the phase of the data is shifted and the phase of the pilot is not shifted so that phase shift caused by fading which may be generated in the process of signal transmission can be discriminated based on the pilot. Since the pilot is a signal known to a BS and an MS, if the phase of the pilot is shifted during transmission, it can be understood that the phase of the ACK/NACK signal is wholly shifted. Accordingly, an error of the ACK/NACK signal caused by fading can be prevented.

The following Table 13 shows another example of the method for transmitting the ACK/NACK signal and the radio resource allocation request.

TABLE 13

| ACK 2-bit symbol | Vector indices per Tile |
|---|---|
| ACK | 0, 0, 0 |
| NACK | 4, 7, 2 |
| ACK + BW request | 1, 3, 5 |
| NACK + BW request | 2, 4, 6 |

Transmission of only the ACK signal, transmission of only the NACK signal, transmission by multiplexing of the ACK signal and the radio resource allocation request (bandwidth request), and transmission by multiplexing of the NACK signal and the radio resource allocation request may be expressed as two bits. Codewords for the above four cases may be generated. Four codewords may be constructed by different vector indices as shown in Table 13. Table 8 may be applied to modulation symbols for the vector indices. The codewords indicated in Table 13 are exemplary only and various codewords may be constructed such that distances between codewords are the same by arranging vectors between codewords so as not to overlap. Multiplexing control signals indicated by the variously constructed codewords are not limited.

The BS detects the ACK/NACK signal and the radio resource allocation request from the received ACK/NACK channel and allocates radio resources (S1240). The MS to which the radio resources are allocated transmits uplink control information or data using the radio resources (S1250).

The MS multiplexes the radio resource allocation request by shifting the phase of the ACK/NACK signal included in the ACK/NACK channel. Then a control channel for an additional radio resource allocation request is not required. Therefore, control signaling can be reduced.

Although a downlink HARQ scheme has been described, the technical spirit of the present invention may be applied to an uplink HARQ scheme.

In the embodiments of the present invention, the MS multiplexes the CQI and the radio resource allocation request through the CQICH and multiplexes the ACK/NACK signal and the radio resource allocation request through the ACK/NACK channel. However, the MS may multiplex a plurality of control signals and may transmit the control signals through one channel. For example, the CQI and the ACK/NACK signal may be multiplexed. Alternatively, the radio resource allocation request may be multiplexed with multiple input multiple output (MIMO) feedback information.

Various types of control signals may be multiplexed by changing a phase-shifted value. For example, when 4-step phase shift is used, 2-bit control signals may be multiplexed.

Hereinafter, a different bandwidth request scheme is applied to the embodiment of the present invention according to a service type. For the sake of convenience, such a scheme will be referred to as a dynamic contention-free bandwidth request scheme.

For delay-sensitive services, for example, an unsolicited grant service (UGS), a real-time polling service (rtPS), an extended real-time polling service (ertPS), etc., an MS should simultaneously notify a BS of maximal available information necessary for allocation in order to transmit uplink data without delay. Accordingly, the MS uses all resources of a specific control channel to transmit bandwidth request information.

For delay-insensitive services, for example, a best-effort (BE) service, a non-real-time polling service (nrtPS), etc., the MS need not to simultaneously inform the BS of all necessary information. Hence, the MS transmits to the BS limited bandwidth request information together with other information (e.g., CQI or precoding matrix index (PMI)) transmitted through a control channel.

When an uplink fast feedback control channel or an uplink HARQ feedback control channel is allocated to a corresponding MS, the MS performs a dynamic contention-free bandwidth request using the allocated channel and a detailed description thereof is as follows.

1. The MS confirms whether a service type for a bandwidth request is sensitive to delay.

2-1. If the service type is sensitive to delay, the MS transmits bandwidth request information instead of CQI information through a fast feedback channel.

2-2. Upon receiving an uplink grant message for uplink resources, the MS transmits data through the uplink resources.

3-1. If the service type is not sensitive to delay, the MS transmits the CQI information by shifting the phase of the fast feedback channel. In this case, limited bandwidth request information may be transmitted together with the CQI information.

3-2. Upon receiving the phase-shifted fast feedback channel, the BS recognizes that the MS requires the uplink resources and transmits the uplink grant message for causing the MS to transmit the bandwidth request information to obtain detailed bandwidth request information.

3-3. Upon receiving the uplink grant message, the MS transmits bandwidth request information or a bandwidth request message corresponding to the service type to the BS. Upon receiving the uplink grant message for the uplink resources according to the bandwidth request information or message, the MS transmits data through the uplink resources.

The above processes will now be described with reference to FIG. 13.

Figure 13:
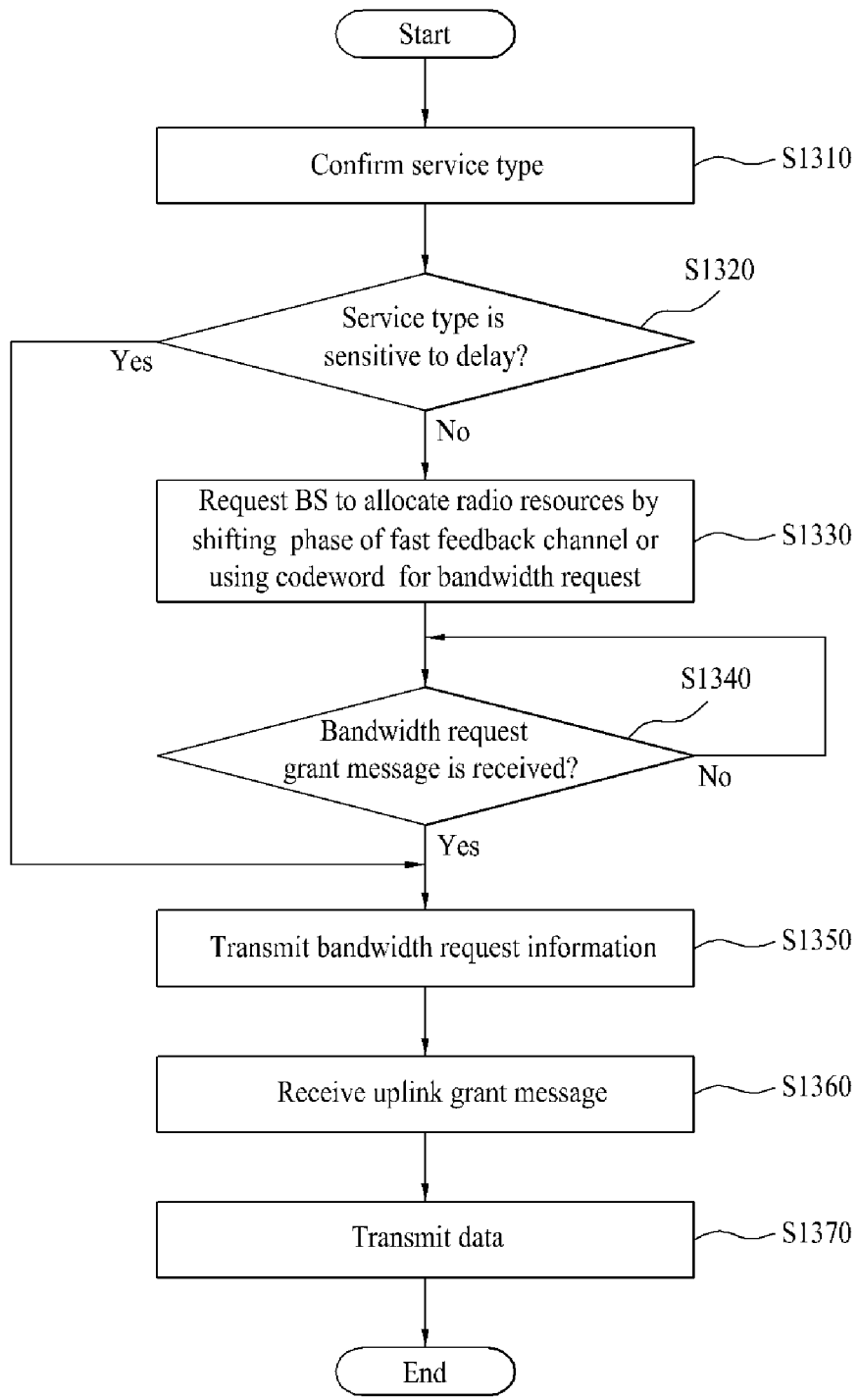
FIG. 13 is a flowchart showing an uplink data transmission method according to an exemplary embodiment of the present invention.

FIG. 13 is a flowchart showing an uplink data transmission method according to an exemplary embodiment of the present invention.

The MS confirms a service type for a bandwidth request (S1310).

If the service type is sensitive to delay (S1320), the MS transmits bandwidth request information corresponding to the service type to the BS (S1350). If the service type is not sensitive to delay (S1320), the MS requests the BS to allocate radio resources by shifting the phase of a fast feedback channel or using a codeword for a bandwidth request of the fast feedback channel (S1330).

If a bandwidth request grant message is received from the BS in correspondence to the codeword for the bandwidth request of the phase-shifted fast feedback channel or the fast feedback channel (S1340), the MS transmits bandwidth request information corresponding to the service type to the BS (S1350). In this case, the MS may transmit a bandwidth request message of a conventional scheme to the BS.

The MS receives an uplink grant message for uplink resources according to the bandwidth request information (S1360) and transmits data through the uplink resources (S1370).

Figure 14:
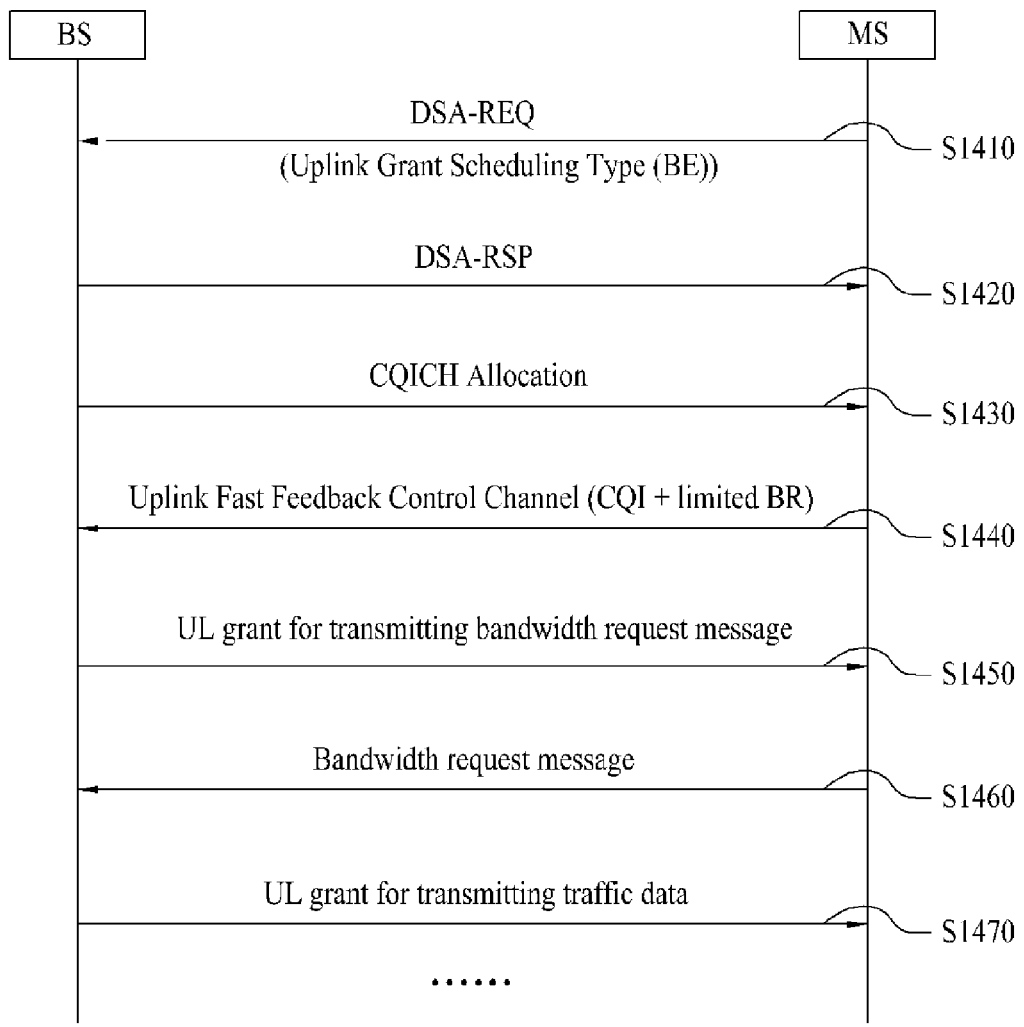
FIG. 14 is a detailed flowchart for a delay-insensitive service in FIGS. 13.

FIG. 14 is a detailed flowchart for a delay-insensitive service in FIG. 13.

An MS transmits a dynamic service addition request message DSA-REQ to a BS (S1410) and receives a dynamic service addition response message DSA-RSP (S1420).

The BS allocates a CQICH (S1430). If the MS requests radio resource allocation for a service allocated through the response message DSA-RSP, the BS confirms an allocated service type. In FIG. 14, since the service type corresponds to a BE service, it is judged that the service type is not sensitive to delay.

Accordingly, the MS may transmit a CQI and a radio resource allocation request through an uplink fast feedback control channel (S1440). A method for transmitting the radio resource allocation request may employ a bandwidth request method using partial codewords or a phase shift bandwidth request method of FIG. 11.

The BS transmits a bandwidth request grant message to the MS (S1450) and the MS transmits a bandwidth request message to the BS (S1460).

Upon receiving an uplink grant message, the MS transmits uplink data for the allocated service (S1470).

Figure 15:
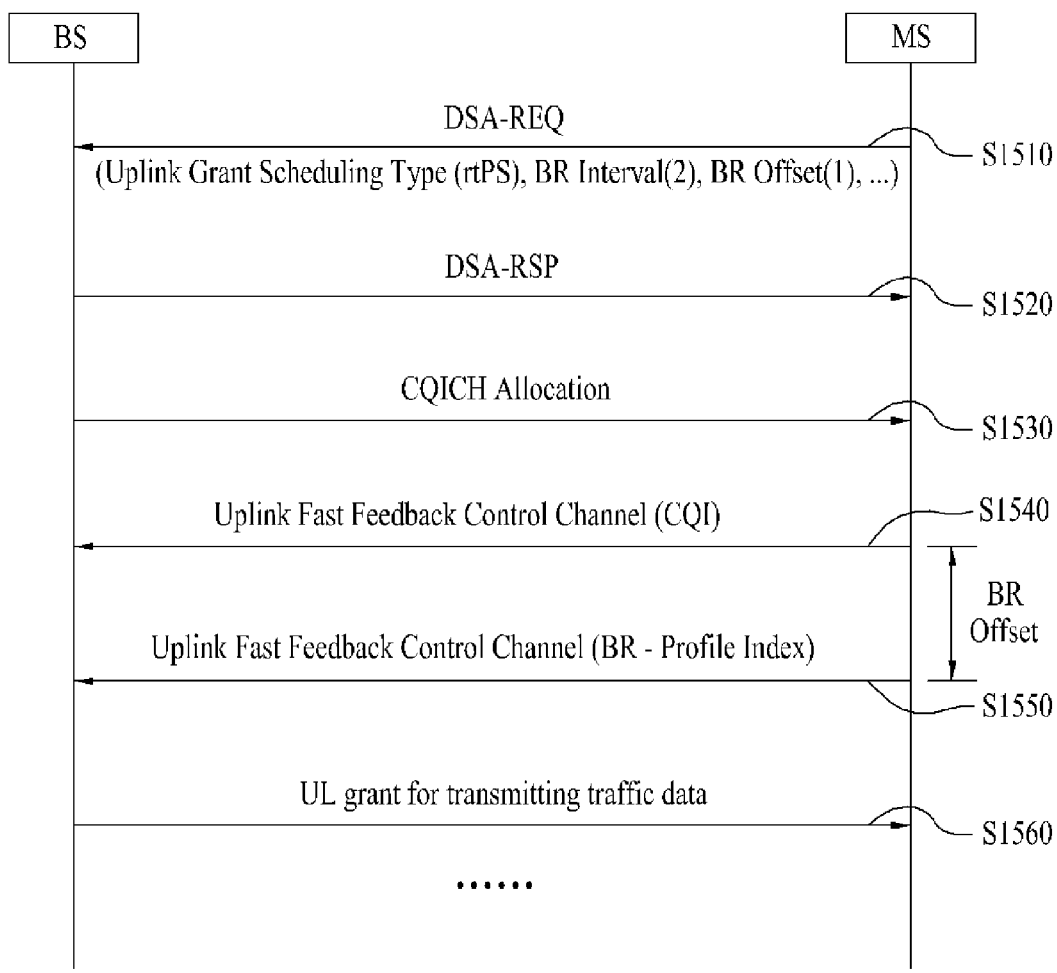
FIG. 15 is a detailed flowchart for a delay-sensitive service in FIG. 13.

FIG. 15 is a detailed flowchart for a delay-sensitive service in FIG. 13.

An MS transmits a dynamic service addition request message DSA-REQ to a BS (S1510) and receives a dynamic service addition response message DSA-RSP (S1520). In this case, the MS may transmit the dynamic service addition request message DSA-REQ including a bandwidth request interval or bandwidth request offset for a later bandwidth request. In FIG. 15, the bandwidth request interval is set to 2 and the bandwidth request offset is set to 1. The unit of the bandwidth request interval or offset may be a frame.

The BS allocates a CQICH (S1530). If the MS requests radio resource allocation for a service allocated through the response message DSA-RSP, the BS confirms an allocated service type. In FIG. 15, since the service type corresponds to an rtPS, it is judged that the service type is sensitive to delay.

Although an uplink fast feedback control channel may be used to transmit a CQI (S1540), it may be used to transmit bandwidth request information at a time point indicated by the bandwidth request offset.

The MS transmits the bandwidth request information corresponding to the service type to the BS through the uplink fast feedback control channel (S1550). The bandwidth request information may be the above-described profile index. As another method for transmitting the radio resource allocation request, the method of FIG. 8 to periodically transmit the profile index may be used. In this case, an interval for transmitting the bandwidth request information is a bandwidth request interval included in the dynamic service addition request message DSA-REQ.

Upon receiving an uplink grant message (S1560), the MS transmits uplink data for the allocated service.

INDUSTRIAL APPLICABILITY

The present invention provides a method for transmitting uplink data according to a dynamic resource request. The present invention prevents collision during an uplink resource request in an Institute of Electrical and Electronics Engineers (IEEE) 802.16m, World Interoperability for Microwave Access (WiMAX) system, etc., reduces message overhead, and can effectively use resources according to a characteristic of a service provided to an MS. The present invention is applicable to equipment such as a BS, an MS, etc.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for transmitting uplink data according to a dynamic resource request by requesting an uplink bandwidth by a contention-free request scheme in a mobile station, the method comprising:
   confirming, by the mobile station, whether a service type for a bandwidth request is sensitive to delay;
   wherein if the service type is not sensitive to delay, the method further comprises:
      requesting, by the mobile station, that a base station allocate a radio resource by shifting a phase of a fast feedback channel and transmitting the phase-shifted fast feedback channel;
      receiving, by the mobile station, a bandwidth request grant message corresponding to the phase-shifted fast feedback channel from the base station;
      transmitting, by the mobile station, bandwidth request information corresponding to the service type to the base station; and
      receiving, by the mobile station from the base station, an uplink grant message for an uplink resource according to the bandwidth request information; and
   wherein if the service type is sensitive to delay, the method further comprises:
      requesting, by the mobile station, that the base station allocate the radio resource by transmitting the bandwidth request information corresponding to the service type to the base station; and
   receiving, by the mobile station from the base station, the uplink grant message for the uplink resource according to the bandwidth request information.

2. The method according to claim 1, wherein the confirmation of whether the service type is sensitive to delay includes confirming a connection identifier (CID) allocated to the mobile station.

3. The method according to claim 1, wherein the service type sensitive to delay includes a real-time polling service (rtPS).

4. The method according to claim 1, wherein the shifting of the phase of the fast feedback channel and transmitting of the phase-shifted fast feedback channel includes multiplexing a radio resource allocation request signal with the phase-shifted fast feedback channel.

5. The method according to claim 1, wherein the bandwidth request information includes any one of codewords mapped to a plurality of bandwidth request profiles according to the service type.

6. The method according to claim 5, wherein the codewords are mapped to at least one profile selected according to traffic priority among predetermined bandwidth request profiles.

7. The method according to claim 5, wherein the codewords include a separator bit for distinguishing between the bandwidth request and other purposes.

8. The method according to claim 1, further comprising:
   notifying the base station of a codeword transmission interval for the bandwidth request through a dynamic service addition request message,
   wherein the transmitting of the bandwidth request information to the base station includes transmitting, to the base station through the fast feedback channel, any one of codewords mapped to a plurality of bandwidth request profiles according to the service type every notification interval.

9. The method according to claim 8, wherein the dynamic service addition request message further includes either an offset or a start frame number of a start position for transmitting the codeword.

10. The method according to claim 8, further comprising, if the codeword transmission interval for the bandwidth request is changed, negotiating the changed interval with the base station through a dynamic service change request message.

11. A method for transmitting uplink data according to a dynamic resource request by requesting an uplink bandwidth by a contention-free request scheme in a mobile station, the method comprising:
   transmitting, by the mobile station, a dynamic service addition request message to a base station, the dynamic service addition request message comprising offset information;
   receiving, by the mobile station from the base station, a dynamic service addition response message corresponding to the dynamic service addition request, the dynamic service addition response message indicating that a fast feedback channel is allocated to the mobile station; and
   confirming, by the mobile station, whether a service type for a bandwidth request is sensitive to delay;
   wherein if the service type is not sensitive to delay, the method further comprises:
      requesting, by the mobile station, that the base station allocate a radio resource to the mobile station by transmitting, via the allocated fast feedback channel, a codeword for the bandwidth request;
      receiving, by the mobile station from the base station, a bandwidth request grant message corresponding transmitting the codeword;

transmitting, by the mobile station to the base station, bandwidth request information corresponding to the service type;
receiving, by the mobile station from the base station, an uplink grant message for an uplink resource according to the bandwidth request information; and
wherein if the service type is sensitive to delay, the method further comprises:
transmitting, by the mobile station, the bandwidth request information corresponding to the service type to the base station after a lapse of the offset since the allocation of the fast feedback channel; and
receiving, by the mobile station from the base station, the uplink grant message for the uplink resource according to the bandwidth request information.

12. The method according to claim 11, wherein the bandwidth request information includes any one of codewords mapped to a plurality of bandwidth request profiles according to the service type.

* * * * *